United States Patent [19]

Crunwell

[11] Patent Number: 4,704,058

[45] Date of Patent: Nov. 3, 1987

[54] FASTENING DEVICE

[75] Inventor: Harry Crunwell, Carlisle, England

[73] Assignee: Tri-Star Data, Cumbria, England

[21] Appl. No.: 767,879

[22] Filed: Aug. 21, 1985

[30] Foreign Application Priority Data

Aug. 24, 1984 [GB] United Kingdom ............... 8421508

[51] Int. Cl.⁴ ...................... F16B 35/04; F16B 37/04
[52] U.S. Cl. ................................ 411/134; 411/149; 411/162; 301/114
[58] Field of Search ............... 411/132, 133, 134, 135, 411/136, 137, 138, 139, 141, 143, 144, 145, 146, 147, 148, 149, 150, 160, 162, 326, 327, 328, 329, 412, 413, 227, 228, 239, 240, 243, 244

[56] References Cited

U.S. PATENT DOCUMENTS

| | | | |
|---|---|---|---|
| 234,849 | 11/1880 | Sammis | 411/240 |
| 403,334 | 5/1889 | Dickson | 411/136 |
| 949,412 | 2/1910 | Betz | 411/228 |
| 1,453,921 | 5/1923 | Cline | 411/228 |
| 2,179,575 | 11/1939 | Hosking | 411/162 |
| 2,271,732 | 2/1942 | Chappuis | 411/147 X |
| 3,263,727 | 8/1966 | Herpolsheimer | 411/136 |
| 3,329,190 | 7/1967 | Oldenkott | 411/136 |
| 3,417,802 | 12/1968 | Oldenkott | 411/134 |
| 3,481,381 | 12/1969 | Black | 411/162 |
| 4,034,788 | 7/1977 | Melone | 411/134 |

FOREIGN PATENT DOCUMENTS

| | | | |
|---|---|---|---|
| 145619 | 1/1950 | Australia | 411/240 |
| 48199 | 7/1889 | Fed. Rep. of Germany | 411/240 |

Primary Examiner—Neill Wilson
Attorney, Agent, or Firm—Parkhurst & Oliff

[57] ABSTRACT

A vibration resistant fastening device includes a fastener (1) comprising a shank (20) and a drivable head (21), the shank (20) having a first handed thread closer to the head (21) and an opposite handed thread further from the head (21). A nut (2) is threadably engaged upon the first handed thread and annular washers (3 and 4) carrying first and second interengageable cam-faces are disposed around the shank (20). In use the opposite handed threaded portion of the shank (20) is threadably engaged in a receiving member (25) and the washer cam-faces (5) are clamped together between the nut (2) and the receiving member (25). The first annular washer (3) is fixed to the nut (2) and the second annular washer (4) is fixed to the receiving member 25, via an intermediate member (26), and the cam-faces (5) co-operate to increase the tensile stress in the shank (20) when the nut (2) is turned in the loosening direction under the influence of vibration.

11 Claims, 11 Drawing Figures

FASTENING DEVICE

BACKGROUND OF THE INVENTION

This invention relates to a fastening device. In particular the invention relates to a fastening device which includes a fastener having a threaded shank, which in use is engaged in a threaded bore formed in a receiving member. The shank may extend through a number of intermediate members which are to be clamped to the receiving member by the fastener.

It is well known that conventional threaded fasteners, such as bolts, set screws, cap screws and the like, after having been tightly screwed into a receiving member tend to become loosened when subjected to vibration.

Many methods of overcoming this problem have been proposed, however the present invention is concerned with fastening devices which employ locking arrangements having interengaging ramps or cams located between the head of the fastener, or a nut engaged on the fastener and the receiving member. In known devices the locking arrangement may comprise a pair of annular washers, each having a cam face on one side and a friction face on the opposite side. Such a washer pair is employed cam-face to cam-face, between the head of the fastener, or the nut and the receiving member. Alternatively the head of the fastener, or the nut may carry one of the cam-faces, which interacts directly with the cam-face of a single washer. In all cases the rise or pitch of the cams is greater than the rise or pitch of the threads of the fastener.

In use, on tightening the fastener, the washer adjacent the head or nut (if present) becomes fixed thereto through the engagement of the friction surface of the washer with the surface of the nut or fastener head. Likewise the other washer becomes fixed to the receiving member (or an intermediate member if present).

When the assembly is subjected to vibration and the nut or fastener head attempts to rotate in the loosening direction, the cam face on the head, nut or washer fixed thereto, is forced to climb the cams of the washer fixed to the receiving member (or intermediate member if present), thereby increasing the clamping load and preventing the further loosening of the fastener.

Fastening devices employing this type of locking arrangement have been known for a very long time. For example arrangements of this type were described in U.S. Pat. Nos. 723,590 and 743,822 of 1903 and more recently in U.S. Pat. Nos. 3,263,727; 3,329,190 and 4,134,438; German Pat. Nos. 684466 and 2413760 and British Pat. No. 907826.

However, all of these known arrangements suffer from two major disadvantages which preclude their use in applications where stringent safety regulations are in force with regard to the possibility of fastening devices failing in use and, where the fastening devices need to be released and reused.

Firstly, when the fastener is tightened the friction face, or faces of the washer, or washers is caused to scrape across the face, or faces onto which it, or they are to become fixed. This scraping causes considerable damage to both mating components, which can result in premature failure of either and which reduces the resulting grip between the components. These problems are exacerbated by any repeated tightening and untightening of the fastener. Secondly in the course of unscrewing the fastener, the cam-faces are caused to ride over each other. Although in previous arrangements the maximum 'lift' of the cams has been restricted, so as not to cause the shank of an associated fastener to be stretched beyond its elastic limit when the fastener is unscrewed; this has not proven effective in practice. It has been found that in many applications there is a grave risk of the shank of the fastener being stretched beyond its yield point and in others, the fastener and the cam-faces are damaged beyond repair when attempts are made to release the fastener.

SUMMARY OF THE INVENTION

According to the present invention there is provided a fastening device including a fastener comprising a shank and a driveable head, the shank having a first handed thread closer to the head and an opposite handed thread further from the head, a nut threadably engaged upon the first handed thread and first and second interengageable cam faces circumferentially disposed around the shank, arranged so that when in use with the opposite handed threaded portion of the shank threadably engaged in a receiving member and the cam-faces clamped together between the nut and the receiving member, the first cam face is fixed to the nut and the second cam-face is fixed to the receiving member and the cam-faces cooperate to increase the tensile stress in the shank when the nut is turned in a loosening direction.

In an embodiment each of the interengageable cam faces comprises a circumferential array of inclined ramps, said arrays being arranged such that in use, turning the nut in a loosening direction causes the ramps in the first array to ride up the ramps in the second array, thereby forcing the arrays apart.

In further embodiments the first cam-face or array of inclined ramps may be formed either on the nut or on one side of an annular washer, the other side of which is provided with a friction face for gripping the nut. The second cam-face or array of inclined ramps may be formed on the receiving member, an intermediate member located between the nut and the receiving member, or on one side of a second annular washer, the other side of which is also provided with a friction face.

To release a fastening device in accordance with the invention, the nut is held still with respect to the receiving member and the head of the fastener is turned in the direction which both withdraws the shank from the receiving member and lifts the nut away from the receiving member. Thus the cam-faces or inclined ramps are separable without having to ride over each other. Therefore there is no risk of the fastener shank being overstressed, or of the cam-faces or inclined ramps being damaged during disassembly.

The tightening procedure is the reverse of the release procedure: the lock nut is held still with respect to the receiving member and the driveable head turned to screw the fastener into the receiving member. Thus since the cam-faces, or inclined ramps are lowered onto each other, there is no possibility of the cam-faces, or friction faces of any intermediate washers, being scraped across each other.

In a further embodiment the shank of the fastener is of a larger diameter where it carries the first handed thread than where it carries the opposite handed thread. An advantage of this embodiment is that in embodiments where the drivable head has a greater diameter than any part of the shank of the fastener, it allows the easy installation of the nut upon the first handed thread, by eliminating the possibility of the nut becoming jammed on the opposite handed thread during installation.

In use it has been discovered that when embodiments of the present invention installed in appropriate receiving members have been subjected to vibration, the nut tends to turn a short way in the loosening direction and not fall back when the vibration is stopped. The effect of this is to actually increase the tensile stress in the shank, the clamping load exerted by the fastening device and the grip exerted on the shank by the threads of the nut and receiving member, thus preventing any loosening of the fastener.

The present invention is particularly useful in circumstances where the bore in the receiving member is either blind, or only readily accessible from the side the shank enters therein. Thus in accordance with a second aspect of the present invention, devices in accordance with the first aspect of the invention are employed in methods of clamping intermediate members to receiving members of this type.

One example of such a method is the clamping of a vehicle wheel to a vehicle wheel hub. The loss of wheels and damage to wheels, wheel studs and hubs caused by the loosening of wheel nuts or studs, is a serious problem often encountered by operators of heavy vehicles. A detailed discussion of this problem may be found in "The Transport Engineer's Hand Book", 1984, edited by Graham Montgomery at pages 159-165. Thus in an embodiment of the second aspect of the present invention the receiving member is embodied by a vehicle wheel hub, brake drum or the like and the receiving member is a vehicle wheel.

In known arrangements which employ intermediate washers provided with friction surfaces, said surfaces usually comprise at least one wedge like tooth which in use causes a linear wedge shaped notch in a mating surface. In general the tooth and the notch formed by the tooth extend radially outwardly from the shank fastener on which the washer is engaged.

When a notch is formed by the tooth, localized stress is caused in the material providing the mating surface, whether it be on the nut, an intermediate member or the receiving member and a stress fracture extending from the notch can be produced in that material. In extreme cases this type of fracture can result in failure of the material.

It is an object of a further aspect of this invention to provide a washer having a friction surface which substantially reduces or eliminates the risk of such a stress fracture being caused.

According to that further aspect of the present invention there is provided an annular washer having a cam-face formed on its first side and a friction face formed on its second side characterized in that the friction face comprises a tooth member in the form of a ridge having no rectilinear edges rising from a substantially planar surface. Preferably the ridge is in the form of a closed curved loop. In an embodiment a plurality of circular ridges are formed on the second side of the washer to provide a friction face.

An advantage of this further aspect of the present invention is that when clamped together in use, the teeth of the washer friction faces bite into the surfaces which they engage forming indentations which do not have rectilinear edges. Thus the resulting stress in the material engaged by the washers is not unidirectional, thereby reducing the likelihood of the propagation of a stress fracture from the indentation.

Clearly washers in accordance with this further aspect of the invention may be employed to considerable advantage in devices in accordance with the first aspect of the invention.

BRIEF DESCRIPTION OF THE DRAWINGS

Particular embodiments of all the aspects of the present invention will now be described by way of non-limiting examples only, with reference to the following drawings.

DESCRIPTION OF THE PREFERRED EMBODIMENTS

Figure 1:
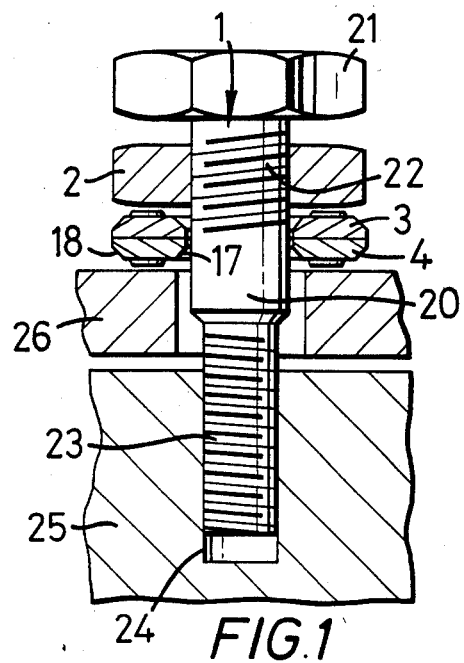
FIG. 1 is a view, partly in section, of a first embodiment of the present invention.

The fastening device illustrated in FIG. 1 comprises a threaded fastener in the form of a bolt 1, a hexagonal nut 2 and a pair of substantially identical lock washers 3 and 4.

Figure 2:
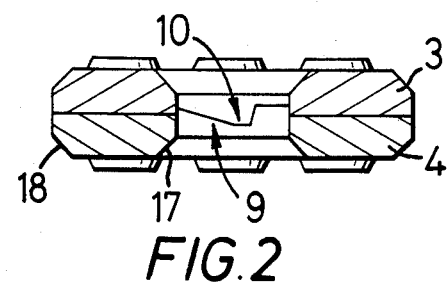
FIG. 2 is a section through the washer assembly of the first embodiment.
Figure 3:
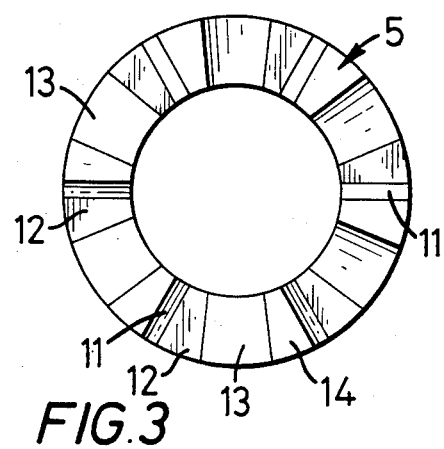
FIG. 3 is a plan view of a washer from the assembly shown in FIG. 2.
Figure 4:
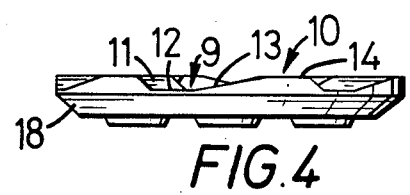
FIG. 4 is a side view of the washer shown in FIG. 3.

The lock washers 3 and 4 are shown in detail in FIGS. 2, 3 and 4. Each of the washers 3 and 4 has a cam-face surface 5 and a friction surface 6.

Figure 6:
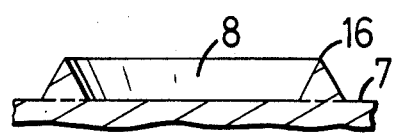
FIG. 6 is a scrap semi-sectional view of a ridge.
Figure 7:
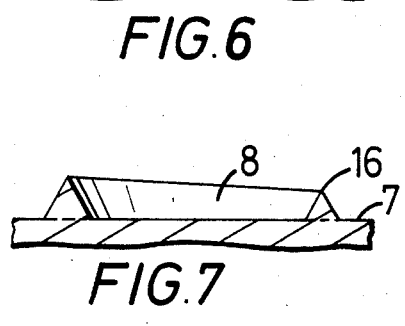
FIG. 7 is a scrap semi-sectional view of an alternative ridge.
Figure 8:
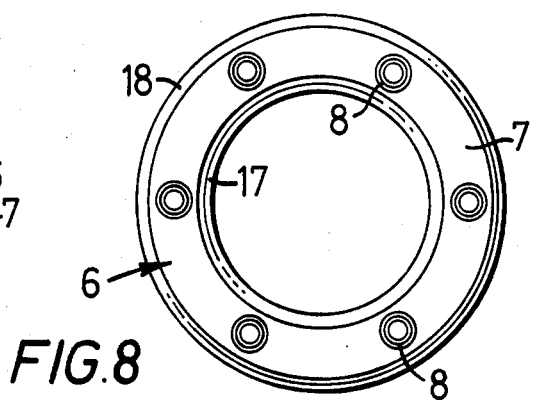
FIG. 8 is an underside view of a washer.

The friction surface 6 comprises a substantially planar annular surface 7 provided with an array of circular ridges 8. Each ridge 8 is triangular in cross-section (see FIG. 6) and has a circular apex 16 which lies in a plane parallel to the surface 7. In an alternative embodiment shown in FIG. 7, the apex 16 is inclined relative to the surface 7.

The cam-face surface 5 of each washer 3 and 4 is formed by an alternating circumferential succession of shallow depressions 9 and complementary projections 10. The depressions 9 of the washer 3 are engageable by the projections 10 of the washers 4 and the projections 10 of the washer 3 are engageable in the depressions 9 of the washer 4 (see FIG. 2). Each depression is defined at one end by a shoulder 11 upwardly stepped from one end of a flat base 12 and at the other end by a cam surface 13 upwardly inclined from the other end of the base 12. Each projection is in turn defined at its first end by an inclined cam surface 13 terminating at a first end of a flat crest 14 and at its second end by a shoulder 11 extending downwardly from the second end of the crest 14.

Figure 5:
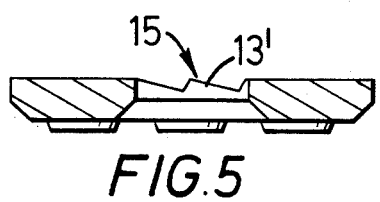
FIG. 5 is a section through an alternative washer.

The washer illustrated in FIG. 5 shows an alternative arrangement for the cam-face surface 5 of either washer 3 or 4. In this alternative arrangement, the alternating depressions 9 and projections 10 have been replaced by an annular array of saw tooth cams 15 each of which has an inclined cam surface 13'. The inner and outer annular margins of each washer 3 and 4 are provided with inner and outer inclined, annular chamfer surfaces 17 and 18 respectively. Both chamfer surfaces extend from the friction surface 6 towards the cam-face surface 5.

The outer annular chamfer surface 18 allows the washer to be identified and correctly orientated by an industrial robot. The inner annular chamfer surface 17 prevents the inner margin of the washer from engaging the fastener and reduces the possibility of a fracture at this point.

Referring back to FIG. 1, the bolt 1 has a cylindrical shank 20 extending from a conventional hexagonal head 21. The shank 20 has a large diameter portion 22 adjacent to the head 21 and a smaller diameter portion 23 remote from the head 21. The larger diameter portion 22 carries a right-hand thread and the smaller diameter portion 23 carries a left-hand thread; the dimensions of said shank portions 22 and 23 are such that the nut 2 may slide over the shank portion 23 witout hindrance and become threadably engaged on the shank portion 22.

The rise or pitch of the inclined cam surfaces 13, or 13' in the alternative embodiment of FIG. 3, is greater than the pitch or rise of the thread formed on the larger diameter portion 22 of the shank 20.

In use the nut 2 is engaged on the larger diameter shank portion 22 and the smaller diameter shank portion 23 is threadably engaged in a blind tapped hole 24 in a receiving member 25. In an alternative receiving member (not shown) the tapped hole is not blind, but extends right through the receiving member. Lock washers 3 and 4 and an intermediate member 26 are engaged on the shank 20 between the nut 2 and the receiving member 25. The arrangement is such that when the head 21 is turned anticlockwise and the nut 2 is held still relative to the members 25 and 26, the small diameter shank portion 23 is caused to screw deeper into the hole 24 and the nut 2 is caused to progress along the shank 22, away from the head 21. The net effect is that the intermediate member 26 and the lock washers 3 and 4 become clamped between the nut 2 and the receiving member 25 and, the circular ridges 8 become embedded in the nut 2 and the intermediate member 26. In becoming so embedded, the ridges 8 are not scraped across the nut 2 or the intermediate member 26.

When the tightened assembly as described above is subjected to vibration, the tensile stress in the shank 20 acts to force the nut 2 to climb the thread on the large diameter portion 22 of the shank 20, in the loosening direction. The washer 3 turns with the nut 2, and the inclined cam surfaces 13 or 13' of the washer 3 are forced to climb the inclined cam surfaces 13 or 13' of the washer 4 which itself is fixed to the intermediate member 26. Since the pitch of the cam surfaces 13 or 13' is greater than the pitch of the threads engaging the nut 2, the washers are forced apart, by the action of the cams, at a greater rate than that at which the nut 2 can climb its thread. Thus the clamping load exerted by the device is thereby increased, which in turn causes the grip exerted on the shank 1 by the threads of the nut 2 and the receiving member 25 to increse and further loosening of the fastener is restricted.

To release the bolt 1 from this clamping position, the head 21 should be turned in a clockwise direction, relative to the remainder of the assembly, thereby causing the intermediate member 26 and the nut 2 to move apart. Thus the arrangement shown in FIG. 1 may be unclamped without the nut 2 being rotated relative to either member 25 or 26 and therefore there is no need for the cam surfaces on the lock washers 3 and 4 to ride over each other during unclamping.

Figure 9:
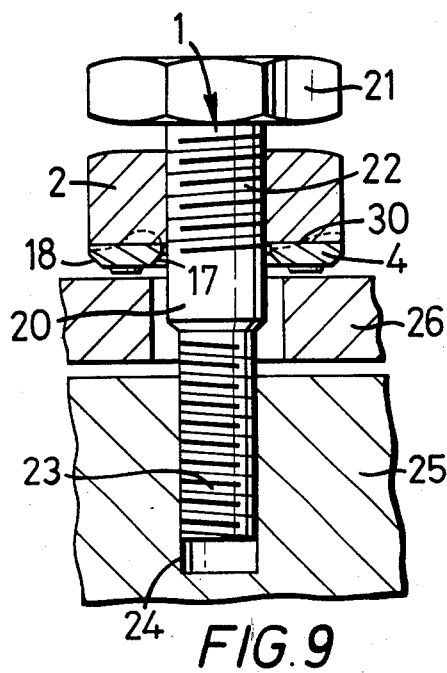
FIG. 9 shows an alternative embodiment of the present invention.
Figure 10:
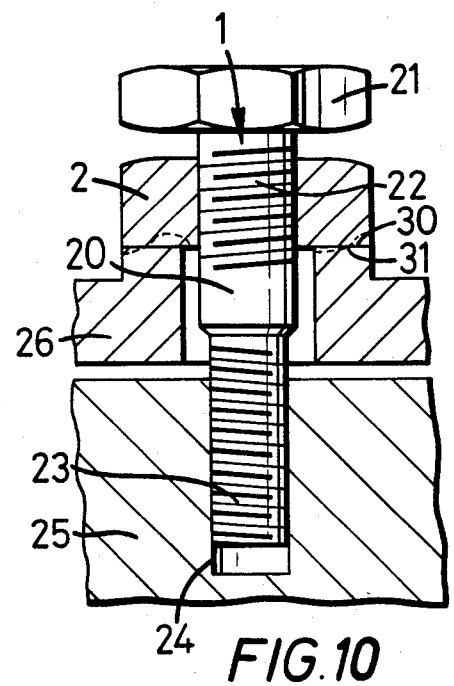
FIG. 10 shows a third embodiment of the present invention.
Figure 11:
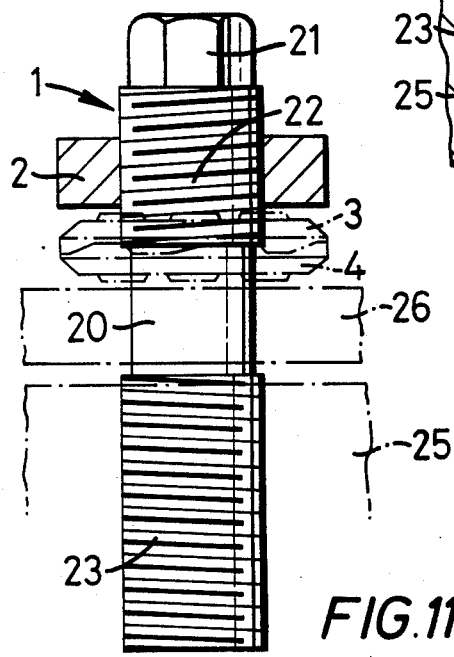
FIG. 11 shows a fourth embodiment of the present invention.

Components of the embodiments shown in FIGS. 9, 10 and 11 which correspond to previously described components have been given the same reference numerals in these figures. The embodiment illustrated in FIG. 9 differs from that shown in FIG. 1 only in that an upper lock washer is not employed and a cam-face surface 30 is formed directly upon the nut 2. The cam-face surface 30 is formed so as to engage the cam-face surface 5 of the remaining washer 4.

The embodiment illustrated in FIG. 10 differs from that shown in FIG. 1 only in that no lock washers are employed and cam-face surfaces 30 and 31 are formed directly upon the nut 2 and the intermediate member 26. The cam-face surface 30 and 31 are of the same forme as those employed on the lock washers 3 and 4 previously described.

The embodiment illustrated in FIG. 11 differs from that shown in FIG. 1 in that the shank portions 22 and 23 are of equal diameter and the hexagonal head 21 is dimensioned to allow the nut 2 to be passed over the head 21, thereby to come into engagement with the thread formed on shank portion 22. Thus when the embodiment shown in FIG. 11 is in use, the bolt 1 may be screwed into a receiving member 25 and the washers 3 and 4 complete with the intermediate member 26 installed upon the shank 20 before the nut 2 is engaged upon the shank 20.

The head 21 may be a conventional hexagonal head (as illustrated), slotted to take a screw driver or recessed to accept a hexagonal section "allen" type key (not illustrated).

The embodiments shown in FIGS. 9, 10 and 11 function in precisely the same way as that shown in FIG. 1 and described above.

Clearly it is possible in an alternative embodiment for the larger diameter portion 22 of the shank 20 to carry a left-handed thread and for the smaller diameter portion 23 to carry a right-handed thread. In this case the direction in which the bolt must be turned to tighten or loosen the same is reversed from that described above and the cam-faces are also reversed.

In one particular application of any of the devices illustrated in FIGS. 9, 10 and 11, the receiving member 25 is a vehicle wheel hub and the intermediate member 26 is a vehicle wheel. In this application more than one and often four or more fastening devices are employed to hold a single wheel to a hub.

I claim:

1. A fastening device for screw thread engagement with a receiving member, to clamp an unthreaded intermediate member at a position between a driveable head of the fastening device and the receiving member, said fastening device comprising:
a fastener having the driveable head and a shank, the shank having a first handed thread and an opposite handed thread, the opposite handed thread conforming with a thread on the receiving member for screw thread engagement therewith;
a nut threadably engaged upon the first handed thread and positionable between the driveable head and the unthreaded intermediate member; and
first and second interengageable cam-faces, comprising first and second circumferential arrays of inclined ramps, disposed around the shank and positionable between the nut and the unthreaded intermediate member;

wherein, when in use with the opposite handed threaded portion of the shank threadably engaged with the receiving member and the cam-faces clamped together between the nut and the unthreaded intermediate member, said unthreaded intermediate member is clamped at a position between the nut and the receiving member, the first cam-face is fixed in rotation to the nut, the second cam-face is fixed in rotation to the unthreaded intermediate member, and turning the nut in a loosening direction causes the ramps in the first array to ride up the ramps in the second array, forcing the arrays apart and thereby increasing the tensile stress in the shank.

2. A fastening device as claimed in claim 1, characterized in that the first cam-face is formed on one side of a first annular washer, the other side of which is provided with a friction face for gripping the nut, and the second cam-face is formed on one side of a second annular washer, the other side of which is provided with a friction face for gripping the intermediate member.

3. A fastening device as claimed in claim 1, characterized in that the first cam-face is formed on the nut, and the second cam-face is formed on one side of an annular washer, the other side of which is provided with a friction face for gripping the intermediate member.

4. A fastening device as claimed in claim 1, characterized in that the first cam-face is formed on the nut and the second cam-face is formed on the intermediate member.

5. A fastening device as claimed in claim 1, characterized in that the part of the shank carrying the first handed thread has a greater diameter than the part of the shank which carries the second handed thread.

6. A fastening device as claimed in claim 2, characterized in that each friction face comprises at least one raised tooth member, in the form of a ridge having no rectilinear edges, extending from a substantially planar surface.

7. A fastening device as claimed in claim 6, characterized in that the ridge is in the form of a closed curved loop.

8. A fastening device as claimed in claim 3, characterized in that the friction face comprises at least one raised tooth member, in the form of a ridge having no rectilinear edges, extending from a substantially planar surface.

9. A fastening device as claimed in claim 8, characterized in that the ridge is in the form of a closed curved loop.

10. A method of clamping at least one intermediate member to a receiving member with a fastening device as claimed in claim 1, with the shank of the fastener threadably engaged with the receiving member and extending through a hole in the intermediate member, the intermediate member being clamped between the nut and the receiving member.

11. A method as claimed in claim 10, characterized in that the intermediate member is a vehicle wheel and the receiving member is a vehicle wheel hub.

* * * * *

UNITED STATES PATENT AND TRADEMARK OFFICE
CERTIFICATE OF CORRECTION

PATENT NO. : 4,704,058
DATED : November 3, 1987
INVENTOR(S) : Grunwell

It is certified that error appears in the above-identified patent and that said Letters Patent is hereby corrected as shown below:

On the title page, Item [19]    "Crunwell" to --Grunwell--;

In section [75], change "Crunwell" to --Grunwell--.

Signed and Sealed this

Twelfth Day of April, 1988

Attest:

DONALD J. QUIGG

Attesting Officer

Commissioner of Patents and Trademarks